US008585800B2

(12) United States Patent
Lim

(10) Patent No.: US 8,585,800 B2
(45) Date of Patent: Nov. 19, 2013

(54) APPARATUS AND METHOD FOR FILTERING COOLING DUCT OF BATTERY FOR ELECTRIC VEHICLE

(75) Inventor: Hae Kyu Lim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 57 days.

(21) Appl. No.: 13/312,864

(22) Filed: Dec. 6, 2011

(65) Prior Publication Data

US 2013/0055890 A1 Mar. 7, 2013

(30) Foreign Application Priority Data

Sep. 6, 2011 (KR) .................. 10-2011-0090211

(51) Int. Cl.
*B01D 46/46* (2006.01)
(52) U.S. Cl.
USPC .......... 95/12; 95/14; 95/277; 96/399; 96/417; 96/420; 55/309; 55/422
(58) Field of Classification Search
USPC ............. 55/385.1, 422, 424, 426, 427, 385.3; 123/198 E; 180/65.1, 65.21, 68.5; 903/904, 908
See application file for complete search history.

(56) References Cited

U.S. PATENT DOCUMENTS

| 5,919,278 A * | 7/1999 | Walker .................. 55/385.1 |
| 6,997,966 B2 * | 2/2006 | Iantorno ................. 55/385.1 |
| 7,959,696 B2 * | 6/2011 | Martic et al. ............ 55/344 |
| 2011/0042058 A1 * | 2/2011 | Kikuchi et al. ........... 165/287 |

FOREIGN PATENT DOCUMENTS

JP 2006-054150 A 2/2006
KR 10-2004-0056142 A 6/2004

* cited by examiner

*Primary Examiner* — Duane Smith
*Assistant Examiner* — Minh-Chau Pham
(74) *Attorney, Agent, or Firm* — Edwards Wildman Palmer LLP; Peter F. Corless

(57) ABSTRACT

An apparatus is configured for filtering a cooling duct of a battery for an electric vehicle. More specifically, a dust sensor is installed in the cooling duct through which cooling air is introduced into the battery for the vehicle and a variable filter is installed in the cooling duct to filter the cooling air and open/close the cooling duct via a driving unit. A control unit configured to control the driving unit according to a signal or sensing value from the dust sensor and a measured temperature of the battery. In particular, when dust is not detected, the cooling duct is fully opened by folding the variable filter. If, however, dust is detected an opening degree of the variable filter is adjusted to close or at least partially close the cooling duct according to the temperature of the battery.

9 Claims, 4 Drawing Sheets

APPARATUS AND METHOD FOR FILTERING COOLING DUCT OF BATTERY FOR ELECTRIC VEHICLE

CROSS-REFERENCE TO RELATED APPLICATION

This application claims under 35 U.S.C. §119(a) the benefit of Korean Patent Application No. 10-2011-0090211 filed on Sep. 6, 2011 in the Korean Intellectual Property Office, the entire contents of which are incorporated herein by reference.

BACKGROUND (a) Technical Field

The present disclosure relates to an apparatus for filtering a cooling duct of a battery for an electric vehicle, which is installed in the cooling duct for cooling the battery for a vehicle to filter cooling air while considering cooling performance with reference to a temperature of the battery, and a method for filtering a cooling duct of a battery for a vehicle.

(b) Background Art

An electric vehicle generally refers to a vehicle which is driven by electric devices such as a motor and a battery, and includes both a hybrid vehicle and a vehicle powered by just a battery which is charged by electricity. In such an electric vehicle, the cooling performance of the battery is closely associated with the travel performance and the fuel ratio of the vehicle. The cooling of the battery is very important due to a relationship between the cooling performance of the battery and a durability of the battery.

Some have suggested that the air from an air conditioner can be used to cool the battery. However, if an air conditioning apparatus is directly used to cool the battery to a certain temperature, consumption of the energy required to run the air conditioner lowers the fuel efficiency of the vehicle. Thus, techniques toward cooling of a battery using interior air of an interior of a vehicle are being developed for cooling the battery and saving energy as well. However, when the interior air is used, dust may be introduced into the battery, in which case a cooling fan suctioning interior air fails to operate at its maximum performance, thereby deteriorating the durability of parts.

Cooling fans often become contaminated with dust over time, reducing their performance and deteriorating the performance of the vehicles. Further, in order to repair them, battery modules are withdrawn and fans are replaced and remounted.

The items described as the background art are included only to help understanding of the background of the prevent invention, and should not be construed to admit that it corresponds to the conventional technology known to those skilled in the art.

SUMMARY OF THE DISCLOSURE

The present invention has been made in an effort to solve the above-described problems associated with prior art, and it is an object of the present invention to provide an apparatus and a method for filtering a cooling duct of a battery for an electric vehicle, which can minimize the influence on the cooling air introduced into the battery while at the same time the cooling duct of the battery prevents dust in an interior of the vehicle, maintains cooling performance and prevents generation of dust.

In one aspect, the present invention provides an apparatus for filtering a cooling duct of a battery for an electric vehicle. More specifically, the apparatus includes a dust sensor installed in the cooling duct through which cooling air is introduced into the battery installed in the vehicle. A variable filter is installed in the cooling duct to filter the cooling air and open/close the cooling duct through a driving unit. Additionally, a control unit is configured to control the driving unit based on signals or a sensing value from the dust sensor and the temperature of the battery. In particular, the control unit is configured to fully open the cooling duct by folding the variable filter therein if dust is not detected by the dust sensor and adjust an opening degree of the variable filter to close or partially open the cooling duct according to the temperature of the battery.

In some embodiments, the variable filter includes a rotary shaft installed within the cooling duct to be rotated by the driving unit; and filter wings installed at opposite sides of the rotary shaft to be folded or expanded by the operation of the driving unit.

In another aspect, the prevent invention provides a method for filtering a cooling duct of a battery for an electric vehicle. More specifically, dust is detected using either signals or a sensing value from a dust sensor installed in the cooling duct of the battery for the electric vehicle. If there is no dust detected, the cooling duct is fully opened by folding a variable filter configured to adjust an opening degree of the cooling duct and when dust is detected by the dust sensor, closing or at least partially opening the cooling duct by adjusting an opening degree of the variable filter according to a temperature of the battery.

In some embodiments, when the temperature of the battery exceeds a preset value A, the battery is determined to be overheated, and after the cooling duct is opened, an opening degree of the variable filter is adjusted with reference to the temperature of the battery accordingly.

In another embodiment, when a temperature of the battery exceeds the preset value A, the battery is determined to be overheated, and after the variable filter is folded in for a predetermined time to open the cooling duct, when the temperature of the battery exceeds a preset value B lower than the preset value A with reference of the temperature of the battery, the cooling duct is partially closed, and when the temperature of the battery is lower than the present value B, the cooling duct is closed completely.

In still another embodiment, when a temperature of the battery does not exceed a preset value A, the battery is determined to be normal, and after the cooling duct is closed by expanding the variable filter for a predetermined time, an opening degree of the variable filter is adjusted again with reference to the temperature of the battery.

In yet another embodiment, when a temperature of the battery does not exceed a preset value A, the battery is determined to be normal, and after the cooling duct is closed by expanding the variable filter for a predetermined time, when the temperature of the battery exceeds a preset value B smaller than the present value A with reference to the temperature of the battery again, the cooling duct is partially opened, and when the temperature of the battery is lower than the present value B, the cooling duct is kept continuously closed.

In still yet another embodiment, when dust is detected, an opening degree of the variable filter may be adjusted according to a temperature deviation between battery cells to either close or at least partially closed the cooling duct.

In a further embodiment, when dust is detected, an opening degree of the variable filter is determined according to a maximum temperature of the battery and a temperature of cells so as to either close or at least partially close the cooling duct.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

DETAILED DESCRIPTION

Hereinafter, an apparatus and a method for filtering a cooling duct of a battery for an electric vehicle according to exemplary embodiments of the present invention will be described with reference to the accompanying drawings.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Figure 1:
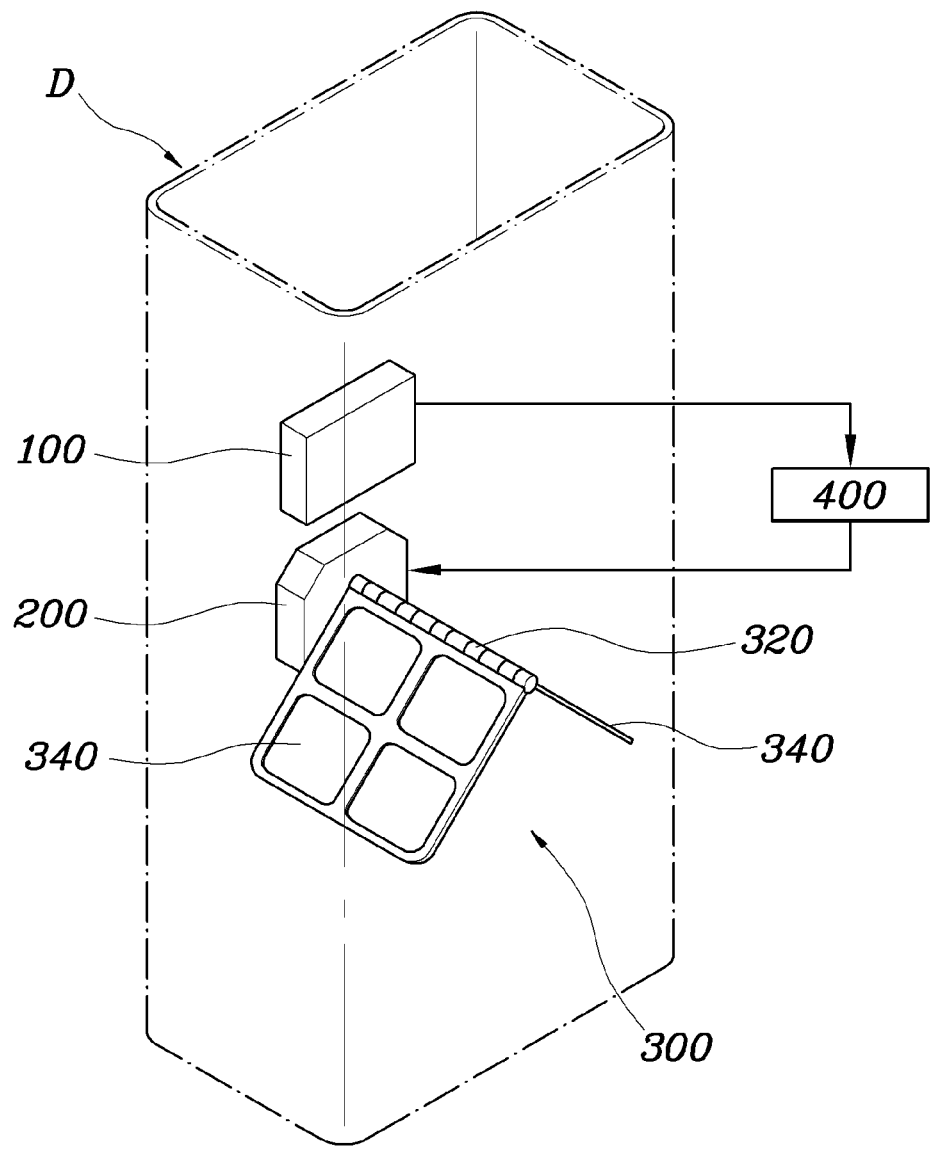
FIG. 1 is a perspective view of an apparatus for filtering a cooling duct of a battery for an electric vehicle according to an exemplary embodiment of the present invention.

FIG. 1 is a perspective view of the apparatus for filtering a cooling duct of a battery for an electric or hybrid vehicle according to an exemplary embodiment of the present invention. The apparatus for filtering a cooling duct of a battery for an electric or hybrid vehicle according to the present invention includes a dust sensor 100 installed in the cooling duct D through which cooling air A is introduced into the battery for the vehicle. A variable filter 300 is installed in the cooling duct D to filter the cooling air A and adjustably open/close the cooling duct D through a driving unit 200. A control unit is configured to control the driving unit 200 based on signals or sensing values received from the dust sensor 100 and the temperature of the battery. Accordingly, the control unit fully opens the cooling duct D by folding the variable filter 300 all the way in if dust is not detected by the sensor 100 and adjusts the opening degree of the variable filter 300 to close or partially close the cooling duct D based on the temperature of the battery if dust is detected by the sensor 100.

The cooling duct D is a means for guiding the cooling air A discharged from the interior or exterior of the vehicle, or an air conditioning apparatus, and is connected to a cooling air inlet opening of the battery. The cooling air is introduced into the battery through the cooling duct D, and typically along with the air comes dust or other foreign substances. Thus, when the cooling air is directly supplied to the battery, dust gathers around the cooling fan, deteriorating cooling performance as a result.

To achieve this, according to the present invention, the dust sensor 100 is installed at an inlet side of the cooling duct D. The dust sensor 100 is configured to measure dust density of the introduced air, using a laser. The driving unit 200 and the variable filter 300 connected to the driving unit 200 are installed in the cooling duct D to selectively filter the cooling air A.

The control unit receives a signal or sensing value from the dust sensor 100 and the current battery temperature from a battery temperature sensor and monitors and determines whether dust is currently being introduced into the battery or whether temperature of the battery is normal or abnormal. Then, based on the determination, an operation of the driving unit 200 is controlled so that an opening degree of the variable filter 300 is adjusted accordingly, allowing the cooling air to be introduced at 100 percent capacity or be filtered if necessary. The variable filter 300 includes a rotary shaft 320 installed within the cooling duct D to be rotated by the driving unit 200, and filter wings 340 installed at opposite sides of the rotary shaft 320 to be folded or expanded by the operation of the driving unit 200.

Figure 2:
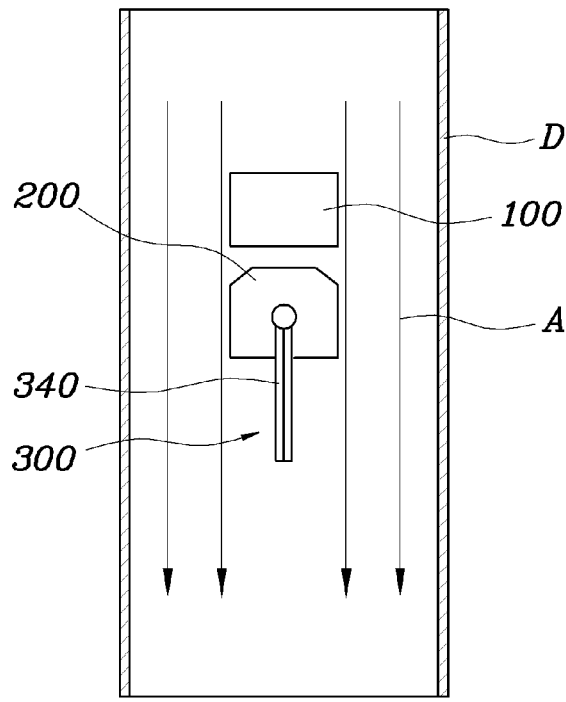
FIGS. 2 to 4 are views illustrating operational modes of the apparatus of FIG. 1.
Figure 3:
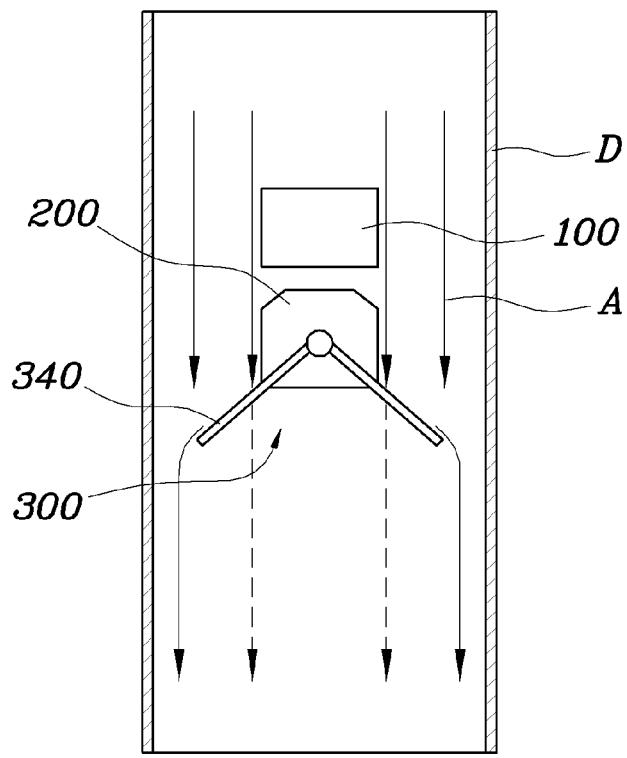
Figure 4:
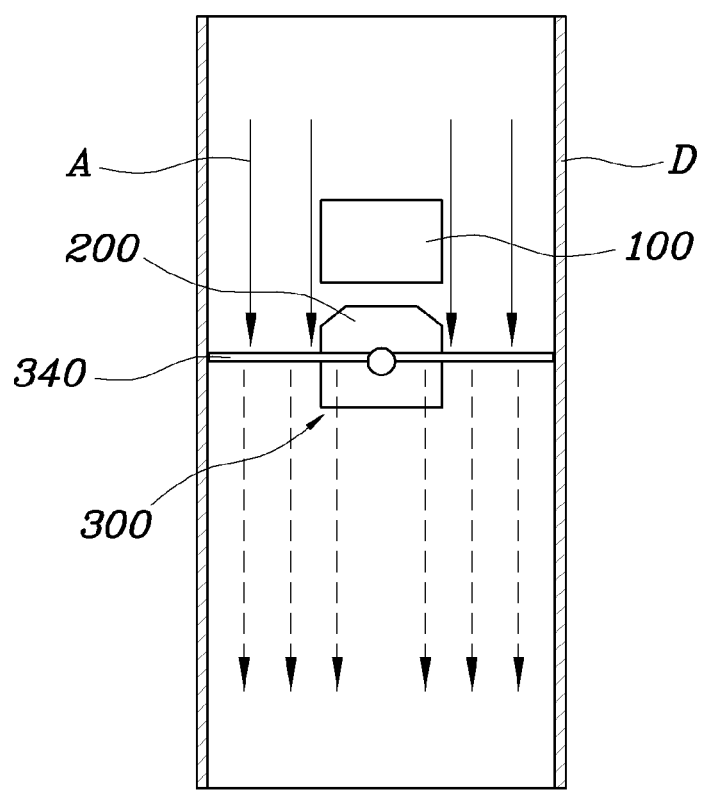

FIGS. 2 to 4 illustrate operational modes of the apparatus for filtering the cooling duct of the battery for an electric vehicle of FIG. 1. When dust is not introduced into the battery or expedited cooling of the battery is required, the driving unit 200 is operated, as illustrated in FIG. 2, to manipulate the filter wing 340 to allow the cooling air A to be introduced at a flow rate and a flux of 100 percent.

When, however, a certain degree of dust is detected and cooling of the battery is necessary, an opening degree of the filter wings 340 is adjusted, as illustrated in FIG. 3, to allow both the original cooling air A and the filtered cooling air to be introduced. However, when a large amount of dust exists or when urgent cooling of the battery is not required, as illustrated FIG. 4, the filter wings 340 are fully expanded or only filtered cooling air is introduced into the cooling duct D.

Figure 5:
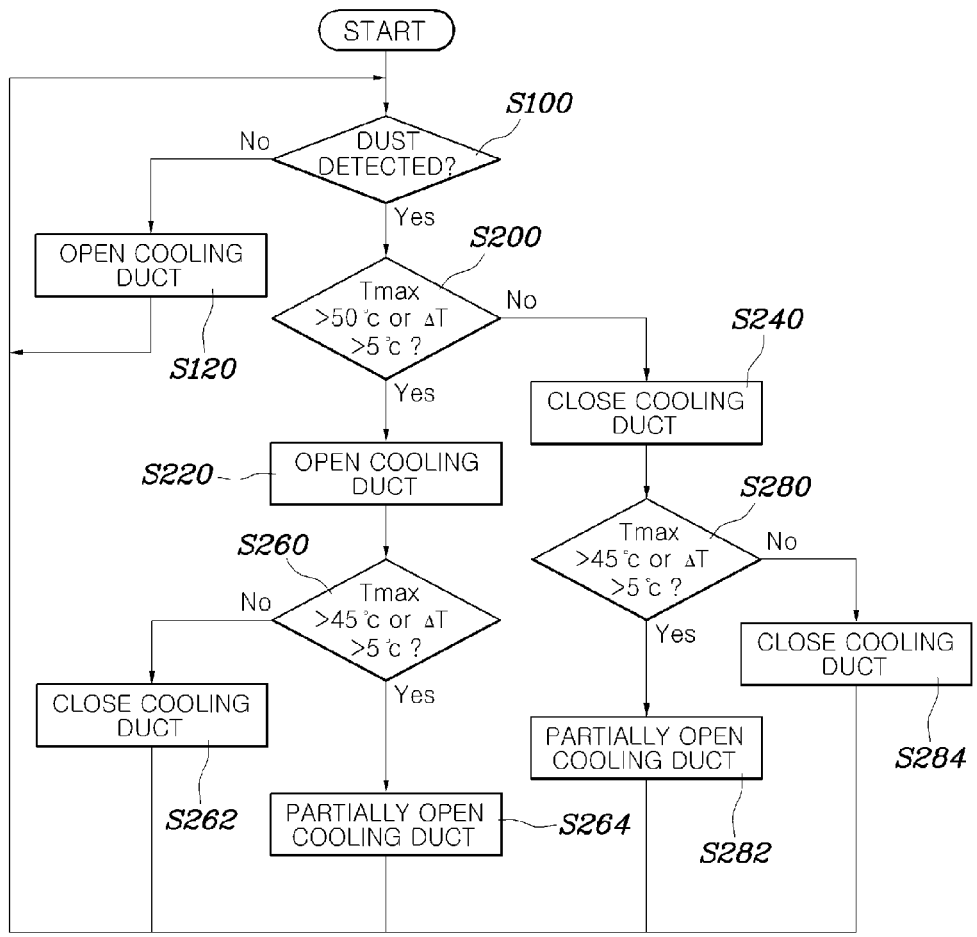
FIG. 5 is a flowchart illustrating a method for filtering a cooling duct of a battery for an electric vehicle according to an exemplary embodiment of the present invention.

The method of filtering a cooling duct of a battery for an electric or hybrid vehicle using the apparatus for filtering the cooling duct of the battery of an electric vehicle of the present invention will be described in detail. FIG. 5 is a flowchart illustrating the method for filtering a cooling duct of a battery for an electric or hybrid vehicle according to an exemplary embodiment of the present invention.

The method for filtering a cooling duct of a battery for an electric vehicle according to the present invention will now be described. In step (S100) dust is detected via a signal(s) or sensing value(s) of a dust sensor installed in the cooling duct of the battery for the electric or hybrid vehicle. When no dust is detected, the cooling duct is fully opened in S120 by folding a variable filter configured to adjust an opening degree of the cooling duct. When, however, dust is detected by the sensor and the associated signal or sensing value is received by the control unit, the cooling duct is closed or at least partially closed by adjusting an opening degree of the variable filter based to a temperature of the battery. That is, it is completely closed when the battery temperature is normal and only partially closed when the battery temperature is abnormally high.

That is, the dust sensor detects dust and sends the signal or sensing value to the control unit. When dust is not detected, the control unit folds filter wings to fully open the cooling duct and sufficiently cool the battery (S120). However, when dust is detected, an opening degree of the variable filter is adjusted according to a temperature of the battery so that the duct is closed or at least partially closed.

In more detail, when a temperature of the battery exceeds a preset value (A), the battery is determined to be overheated, and after the cooling duct is opened (S220), an opening degree of the variable filter is adjusted with reference to the temperature of the battery. In this way, since an opening degree of the variable filter is continuously adjusted with reference to a temperature of the battery over a particular time interval, the introduction of dust into the system can be prevented and the battery can be cooled effectively.

In particular, when a temperature of the battery exceeds the preset value A, the battery is determined to be overheated, and after the variable filter is folded for a predetermined time to open the cooling duct (S220), when the temperature of the battery exceeds a preset value B lower than the preset value A with reference to the temperature of the battery, the cooling duct is at least partially closed (S264), and when the temperature of the battery is lower than the present value B, the cooling duct is completely closed (S262).

That is, for example, when the maximum temperature Tmax of the temperatures of the battery cells exceeds 50 degrees Celsius, the corresponding battery cell is determined to be overheated and the entire cooling duct is temporarily fully opened. In this state, when the maximum temperature Tmax exceeds 50 degrees Celsius after the temperature is measured again, the battery cell is determined to be dangerously overheated so the cooling duct is only partially closed to still allow a significant flow of air into the duct while at the same time filtering out harmful dust particles. However, when the maximum temperature Tmax does not exceed 45 degrees Celsius, the battery cell is determined to be normal and the cooling duct is fully closed to introduce only the filtered cooling air into the system. In this instance, although the flux and flow rate of the cooling air may be reduced to a degree, the cooling of the battery cell is not critical, and therefore the system is unaffected by the reduced flow.

The defined temperatures may be the values A and B, and may be classified into various sections as well. When an opening degree is adjusted for the sections, the control may be performed more precisely.

Moreover, when the temperature of the battery does not exceed a preset value A, the battery is determined to be normal, and after the cooling duct is closed (S240) by expanding the variable filter for a predetermined time, an opening degree of the variable filter is adjusted again with reference to the temperature of the battery.

In more detail, when a temperature of the battery does not exceed a preset value A, the battery is determined to be normal, and after the cooling duct is closed (S240) by expanding the variable filter for a predetermined time, when the temperature of the battery exceeds a preset value B smaller than the present value A with reference to the temperature of the battery again, the cooling duct is partially closed (S282), and when the temperature of the battery is lower than the present value B, the cooling duct is continuously closed (S284).

Here, it has been described with reference to FIG. 5 that the preset value A is 50 degrees Celsius and the preset value B is 45 degrees, however, the present invention is not limited to these value. Those skilled in the art will understand that any value representing efficient operating temperature of a battery may be applied to the present invention without deviating from the overall goals and objectives of the present invention.

Furthermore, when dust is detected, an opening degree of the variable filter may be adjusted according to a temperature deviation between battery cells to either close or at least partially close the cooling duct. While filtering, when dust is detected, an opening degree of the variable filter is determined according to a maximum temperature of the battery and the temperature of cells so as determine whether or not to close or at least partially close the cooling duct. That is, not only when a maximum temperature exceeds a preset value but also when a maximum temperature difference between cells exceeds, for example, 5 degrees Celsius, it is foreseeable that there is a significant problem cooling the battery, in this instance the control unit fully opens the cooling duct to quickly cool down the battery accordingly based upon receiving this temperature deviation.

Accordingly, in the illustrated embodiment of the present invention, both temperatures and temperature deviation are considered, and if any one of condition associated with either the temperature of the battery or a temperature deviation from a specific value, it is determined that temperature is abnormal.

By fluctuating the filtering degree of the cooling duct by utilizing a dust detection sensor and also taking into account the temperature of the battery, while at the same time prioritizing cooling vs. filtering over specific predetermined time intervals, making it possible to prevent damaging both the battery and the components in the air induction system.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. An apparatus for filtering a cooling duct of a battery for an electric or hybrid vehicle, the apparatus comprising:
    a dust sensor installed in the cooling duct through which cooling air is introduced into the battery for the vehicle, the dust sensor configured to detect dust in the cooling air;
    a variable filter installed in the cooling duct to filter the cooling air and open/close the cooling duct through a driving unit controlled according to a sensing value of the dust sensor and a temperature of the battery; and
    a control unit configured to control the driving unit according to the sensing value of the dust sensor and the temperature of the battery, wherein when dust is not detected by the dust sensor, the cooling duct is fully opened by folding the variable filter and wherein when dust is detected, adjusting an opening degree of the variable filter to close or at least partially close the cooling duct according to the temperature of the battery.

2. The apparatus of claim 1, wherein the variable filter includes a rotary shaft installed within the cooling duct to be rotated by the driving unit; and filter wings installed at opposite sides of the rotary shaft to be folded or expanded by the operation of the driving unit.

3. A method for filtering a cooling duct of a battery for an electric vehicle, the method comprising:
    detecting dust using a sensing value of a dust sensor installed in the cooling duct of the battery for the electric vehicle;
    fully opening the cooling duct by folding a variable filter configured to adjust an opening degree of the cooling duct when dust is not detected and to be operated by a driving unit controlled according to the sensing value from the dust sensor and a temperature of the battery; and
    closing or at least partially closing the cooling duct by adjusting an opening degree of the variable filter according to a temperature of the battery when dust is detected.

4. The method of claim 3, wherein when a temperature of the battery exceeds a preset value A, the battery is determined to be overheated, and after the cooling duct is opened, an opening degree of the variable filter is adjusted with reference to the temperature of the battery.

5. The method of claim 3, wherein when a temperature of the battery exceeds the preset value A, the battery is determined to be overheated, and after the variable filter is folded for a predetermined time to open the cooling duct, when the temperature of the battery exceeds a preset value B lower than the preset value A with reference of the temperature of the battery, the cooling duct is at least partially closed, and when the temperature of the battery is lower than the present value B, the cooling duct is completely closed by expanding the variable filter across the duct all the way.

6. The method of claim 3, wherein when a temperature of the battery does not exceed a preset value A, the battery is determined to be normal, and after the cooling duct is closed by expanding the variable filter for a predetermined time, an opening degree of the variable filter is adjusted again with reference to the temperature of the battery.

7. The method of claim 3, wherein when a temperature of the battery does not exceed a preset value A, the battery is determined to be normal, and after the cooling duct is closed by expanding the variable filter for a predetermined time, when the temperature of the battery exceeds a preset value B smaller than the present value A with reference to the temperature of the battery again, the cooling duct is at least partially closed, and when the temperature of the battery is lower than the present value B, the cooling duct is kept continuously closed by keeping the variable filter expanded across the cooling duct.

8. The method of claim 3, wherein when dust is detected, an opening degree of the variable filter may be adjusted according to a temperature deviation between battery cells to close or at least partially close the cooling duct by expanding the variable filter across the cooling duct.

9. The method of claim 3, wherein when dust is detected, an opening degree of the variable filter is determined according to a maximum temperature of the battery and a temperature of cells so as to close or at least partially close the cooling duct by expanding the variable filter across the cooling duct.

* * * * *